(12) United States Patent
Koh

(10) Patent No.: US 8,896,794 B2
(45) Date of Patent: Nov. 25, 2014

(54) LIQUID CRYSTAL DISPLAY DEVICE AND METHOD FOR FABRICATING THE SAME

(75) Inventor: Young-Ju Koh, Paju (KR)

(73) Assignee: LG Display Co., Ltd., Seoul (KR)

( * ) Notice: Subject to any disclaimer, the term of this patent is extended or adjusted under 35 U.S.C. 154(b) by 434 days.

(21) Appl. No.: 12/874,105

(22) Filed: Sep. 1, 2010

(65) Prior Publication Data

US 2011/0157507 A1 Jun. 30, 2011

(30) Foreign Application Priority Data

Dec. 31, 2009 (KR) .......................... 10-2009-0135698
Mar. 22, 2010 (KR) .......................... 10-2010-0025474

(51) Int. Cl.
*G02F 1/1343* (2006.01)
*G02F 1/1362* (2006.01)

(52) U.S. Cl.
CPC ...... *G02F 1/13439* (2013.01); *G02F 1/136227* (2013.01)
USPC .......................................................... 349/141

(58) Field of Classification Search
USPC .......................................................... 349/141
See application file for complete search history.

(56) References Cited

U.S. PATENT DOCUMENTS

| 5,243,202 | A | * | 9/1993 | Mori et al. ........................ 257/59 |
| 6,072,554 | A | * | 6/2000 | Sato ............................... 349/141 |
| 6,972,820 | B2 | | 12/2005 | Lee et al. |
| 7,576,822 | B2 | * | 8/2009 | Yoo et al. ....................... 349/141 |
| 2005/0110931 | A1 | | 5/2005 | Yoo et al. |

FOREIGN PATENT DOCUMENTS

| CN | 1614742 A | 5/2005 |
| CN | 101527307 A | 9/2009 |
| TW | 438987 B | 6/2001 |

\* cited by examiner

*Primary Examiner* — James Dudek
(74) *Attorney, Agent, or Firm* — Birch, Stewart, Kolasch & Birch, LLP

(57) ABSTRACT

A liquid crystal display device and a fabrication method thereof, are discussed. According to an embodiment, the liquid crystal display device includes gate lines on a substrate; data lines on the substrate; common lines disposed substantially in parallel to the gate lines; TFTs formed at intersections between the gate and data lines, each of the TFTs including a gate electrode extending from the corresponding gate line, a gate insulation layer, an active layer, an ohmic contact layer, a source electrode extending from the corresponding data line and a drain electrode spaced apart from the source electrode; passivation layers, each formed on the TFT and having a contact hole for exposing a part of the corresponding drain electrode; and pixel electrodes, each composed of a conductive layer and an insulation layer formed on the corresponding passivation layer and electrically connected to the corresponding drain electrode via the corresponding contact hole.

6 Claims, 13 Drawing Sheets

LIQUID CRYSTAL DISPLAY DEVICE AND METHOD FOR FABRICATING THE SAME

CROSS-REFERENCE TO RELATED APPLICATION

Pursuant to 35 U.S.C. §119(a), this application claims the benefit of earlier filing date and right of priority to Korean Applications No. 10-2009-0135698, filed on Dec. 31, 2009, and No. 10-2010-0025474, filed on Mar. 22, 2010, the contents of which is incorporated by reference herein in its entirety.

BACKGROUND OF THE INVENTION

1. Field of the Invention

The present invention relates to a liquid crystal display (LCD) device, and particularly, to an LCD device capable of increasing an aperture ratio by way of micro-patterning upon forming an electrode line including a pixel electrode of the LCD device and reducing a process time taken by a micro-patterning process, and a fabrication method thereof.

2. Discussion of the Background Art

In general, a thin film transistor (TFT) is widely used as a switching device in semiconductor devices, display devices such as TFT LCD devices, and the like.

Among others, the TFT LCD device is recognized as the next generation high-tech display device with characteristics of low power consumption, high portability, technology-intensiveness and highly value-added aspect.

Among several types of LCD devices, demands of an active matrix type LCD device having TFTs as switching devices for adjusting power-on or power-off for each pixel are increased due to high resolution and capability of realizing videos.

In order to micro-pattern a pixel electrode electrically connected to a TFT, which is widely used as a switching device in a semiconductor device as well as in the LCD device, many technical problems such as lengthy process time, etching non-uniformity and the like, may occur. Especially, various difficulties often arise in achieving a high aperture ratio, which hinders the process of increasing brightness of the LCD device.

From this perspective, a related art LCD device will now be described with reference to FIG. 1.

FIG. 1 is a sectional view schematically showing an LCD device structure according to the related art. As shown in FIG. 1, an LCD device according to the related art includes a color filter substrate (not shown) with color filters, a TFT array substrate 11 facing the color filter substrate, a liquid crystal layer (not shown) interposed between the color filter substrate and the TFT array substrate 11.

Here, the TFT array substrate 11 includes thereon gate lines (not shown), gate electrodes 13a diverged from the gate lines, and a plurality of common electrodes 13b disposed in parallel to the gate lines with spaced gaps therebetween.

A gate insulation layer 15 is formed on the entire surface of the array substrate 11 including the gate electrode 13a. A semiconductor layer 21, which includes an active layer 17 and an ohmic contact layer 19 sequentially formed in an island shape, is formed on the gate insulation layer 15. Here, the active layer 17 is made of pure amorphous silicon (a-Si:H), and the ohmic contact layer 19 is made of impure amorphous silicon (n+a-Si).

On the ohmic contact layer 19, the LCD device further includes a data line 23, which crosses over the gate line (not shown) to define a pixel region, a source electrode 23a extending from the data line 23, and a drain electrode 23b spaced from the source electrode 23a. Here, the gate electrode 13a, the semiconductor layer 21, the source electrode 23a and the drain electrode 23b construct a thin film transistor (TFT) T.

In addition, a passivation layer 25 having a contact hole (not shown) for exposing part of the drain electrode 23b is formed on the entire surface of the source and drain electrodes 23a and 23b and the exposed portion of the active layer 17.

A pixel electrode 31a is formed on the passivation layer 25. The pixel electrode 31a is independently present in each pixel region, and contacts the drain electrode 23b via the contact hole (not shown). Here, the pixel electrode 31a is formed of indium tin oxide (ITO) as a transparent conductive material, and provided in plurality aligned in each unit pixel region and spaced apart from each other by a predetermined gap.

Accordingly, the plurality of common electrodes 13b and the plurality of pixel electrodes 31a formed on the TFT array substrate 11 are aligned horizontally with gaps therebetween, so as to make horizontal magnetic fields responsive to voltages applied thereto. Here, liquid crystal molecules located between the horizontal magnetic fields are affected so as to be driven by the magnetic fields.

Hereinafter, a method for fabricating the related art LCD device of FIG. 1 will be described with reference to FIGS. 2A to 2E.

FIGS. 2A to 2E are sectional views briefly showing sequential processes of a method for fabricating the LCD device of FIG. 1 according to the related art.

As shown in FIG. 2A, a gate line (not shown) and a gate electrode 13a perpendicularly extending from the gate line are formed on a transparent substrate 11. Here, a common line (not shown) disposed in parallel to the gate line is also formed on the substrate 11, in addition to the gate line and the gate electrode extending from the gate line. The substrate 11 also includes thereon a common electrode 13b extending from a common line, which is in parallel to the gate line and spaced therefrom by a predetermined gap.

Next, the gate insulation layer 15 is formed on the entire surface of the substrate 11 having the gate electrode 13a. The semiconductor layer 21, which includes the active layer 17 and the ohmic contact layer 19 sequentially formed in an island shape, is formed on the gate insulation layer 15. Here, the active layer 17 is made of pure amorphous silicon (a-Si:H), and the ohmic contact layer 19 is made of impure amorphous silicon (n+a-Si).

Afterwards, there are provided, on the ohmic contact layer 19, the data line 23 crossing over the gate line, a source electrode 23a extending from the data line 23, and a drain electrode 23b spaced apart from the source electrode 23a with a predetermined gap based upon the gate electrode 13a. Here, the gate electrode 13a, the semiconductor layer 21, the source electrode 23a and the drain electrode 23b construct a TFT T.

A passivation layer 25 made of an inorganic insulating material is formed on the entire surface of the substrate 11 having the data line 23, the source electrode 23a and the drain electrode 23b.

Then, as shown in FIG. 2B, the passivation layer 25 is selectively etched out through a lithography process using photolithography and a patterning process, to form a contact hole 27 for exposing a portion of the drain electrode 23b.

As shown in FIG. 2C, a transparent conductive material such as ITO is deposited on the passivation layer 25 having the contact hole 27, thereby forming a single-layer transparent conductive layer 31.

After coating a photosensitive material on the transparent conductive layer 31, an exposure mask (not shown), which defines a position where the pixel electrode is to be formed, is aligned on the photosensitive material layer (not shown). Lithography process and developing process for emitting infrared light to the photosensitive material layer through the exposure mask are executed so as to form a photosensitive layer pattern 33.

As shown in FIG. 2D, the transparent conductive layer 31 is selectively etched out through a wet etching process by using the photosensitive layer pattern 33 as a barrier layer, thereby forming the pixel electrode 31a. Here, although not shown, the pixel electrode 31a is provided in plurality so as to be aligned in each pixel region by being spaced apart with a predetermined gap. Also, the plurality of pixel electrodes 31a may alternate with the plurality of common electrodes 13b with predetermined spaced gaps therebetween.

As shown in FIG. 2E, after forming the pixel electrode 31a by selectively etching out the transparent conductive layer 31 through the wet etching process, the remaining photosensitive layer pattern 33 is removed completely so as to complete the fabrication of the TFT array substrate of the LCD device.

Afterwards, although not shown, the process of fabricating the LCD device is completed by executing a process of fabricating a color filter array substrate including a black matrix layer and a color filter layer and a process of forming a liquid crystal layer between the color filter array substrate and the TFT array substrate 11.

Considering the LCD device and the fabrication method thereof according to the related art, however, the following problems exist.

According to the LCD device and the fabrication method thereof according to the related art, the etching process used therein should be executed by considering etching capability according to the characteristic of a metal upon etching a single-layer metal layer, for example, ITO, molybdenum, titanium alloy or aluminum, which is used when forming the existing pixel electrode. Accordingly, the etching process becomes complicated. That is, etchant variation becomes drastic according to the type of metal involved, which makes it difficult to implement uniformity over limitations, and which results in a lower efficiency of the etching process and renders employment of a new metal difficult.

Also, for etching a metal layer having a single layer structure, etching uniformities at the upper and lower sides and right and left sides of the metal layer become harder to achieve due to defects, thereby making it difficult to realize micro lines in the etched product.

Further, when etching the single-layer metal layer, the metal layer may be damaged because it is already externally exposed. Consequently, formation of uniform lines becomes difficult, and a time taken for etching the metal layer is increased, thereby lowering productivity.

Thus, in order to form the pixel electrodes or other metal lines, such as the gate lines or the data lines, into micro electrodes each having a micro line-width w1, many technical problems such as an increase in the etching process time, difficulty in obtaining etching uniformity, metal damages and the like, may occur. For instance, various difficulties may arise in fabricating a display device needing high aperture ratios, which causes limitations on increasing the brightness of the display device.

Furthermore, the ITO as the transparent conductive material which is used in the related art LCD device is superior to transmittance but inferior to a contrast ratio, and hard to implement a line-width w1 below about 3.0 μm. If molybdenum titanium (MoTi) is used as a material for addressing such a problem, the contrast ratio may improve; however, a rainbow spot phenomenon where external light looks like a rainbow while it is reflected at a metal electrode and transmitted through a polarizer may occur. Consequently, to obviate the rainbow spot generated while such light is reflected at the metal electrode and transmitted through the polarizer, a low-reflective electrode, which can reduce reflectivity of an electrode, is urgently required.

SUMMARY OF THE INVENTION

To address the above discussed problems and other problems associated with the related art, an object of the present invention is to provide an LCD device capable of improving productivity by increasing an aperture ratio by virtue of micro-patterning of lines and reducing a process time taken by the micro-patterning when forming electrode lines including pixel electrodes of the LCD device, and to provide a fabrication method of the LCD device.

Another object of the present invention is to provide an LCD device capable of being applicable to micro-patterning of metal lines for a semiconductor device or other display devices as well as the micro-patterning of the metal lines including the pixel electrodes of the LCD device, and to provide a fabrication method of the LCD device.

Another object of the present invention is to provide an LCD device applicable to a low-reflective electrode, which is capable of reducing reflectivity, and a fabrication method of the LCD device.

To achieve these and other advantages and in accordance with the purpose of the present invention, as embodied and broadly described herein, there is provided according to an embodiment an LCD device including gate lines disposed on a substrate in a matrix configuration, data lines formed on the substrate and intersecting with the gate lines to define pixel regions, common lines disposed in parallel to the gate lines, TFTs formed at intersections between the gate lines and the data lines, each TFT including a gate electrode diverged from the gate line, a gate insulation layer, an active layer, an ohmic contact layer, a source electrode diverged from the data line and a drain electrode facing the source electrode with a spaced gap, passivation layers each formed on the TFT and having a contact hole for exposing part of the drain electrode, and pixel electrodes each composed of a conductive layer and an insulation layer on the passivation layer and electrically connected to the drain electrode via the contact hole.

In accordance with one embodiment of the present invention, there is provided with a method for fabricating an LCD device, the method including, forming, on a substrate, a gate line having a gate electrode and a common line disposed in parallel to the gate line and having a common electrode, forming a gate insulation layer on an entire surface of the substrate having the gate electrode, forming a semiconductor layer on the gate electrode by interposing the gate insulation layer therebetween, the semiconductor layer comprising an active layer and an ohmic contact layer spaced by a channel region, forming, on the semiconductor layer, a data line intersecting with the gate line to define a pixel region, a source electrode diverged from the data line and a drain electrode spaced from the source electrode, forming a passivation layer on the entire surface of the substrate having the source electrode, the drain electrode and the data line, forming a contact hole by patterning the passivation layer, the contact hole exposing part of the drain electrode, depositing a conductive layer and an insulation layer on the passivation layer, the conductive layer contacting the drain electrode via the contact hole, and etching the conductive layer and the insulation layer to form a pixel electrode, the pixel electrode comprising a conductive layer pattern and an insulation layer pattern.

According to an embodiment, in the LCD device and the fabrication method thereof, a dual layer in a structure including a metal layer and a metal insulation layer is etched so as to be used as a pixel electrode, whereby faster etching speed can be obtained as compared to a single metal layer and accordingly micro electrodes with a high aperture ratio or micro lines with micro line-widths can be formed.

Since the present invention allows the patterning of the micro electrodes by virtue of shortening an etch time, the micro line-width w2 of the pixel electrode can be reduced, as compared to the related art, so as to improve the aperture ratio, which in turn enhances the overall brightness of the display device.

In addition, since the present invention allows the formation of the micro electrodes, for example, pixel electrodes and common electrodes, with micro line-widths w2, the number of pixel electrodes and common electrodes located within a unit pixel region can be increased.

Accordingly, the present invention can increase the strength of an electric field by further narrowing a distance d2 between a pixel electrode and a common electrode, as compared to an existing distance therebetween, while maintaining the aperture ratio. Hence, the reaction speed of the LCD device can be increased by raising the reactivity of liquid crystal, which reacts with the electric field.

Therefore, the formation process of pixel electrodes or other metal lines of the LCD device according to the present invention can be executed more quickly and uniformly than in the related art. Accordingly, the LCD device of the invention achieves a high aperture ratio due to the micro-patterning of electrodes and reduce an etch time taken for the micro-patterning.

In accordance with the LCD device and the fabrication method thereof according to an embodiment of the present invention, when forming pixel electrodes or other metal lines of the LCD device, the etching process can be executed in a state where a dual layer structure has been implemented by forming a metal layer and an inorganic insulation layer including a metal insulation layer, thereby ensuring a quick etch time as compared to the existing single metal layer structure, which results in the reduction of an etch time.

In accordance with the LCD device and the fabrication method thereof according to an embodiment the present invention, since the quick etch time is obtained as compared to the existing single metal layer structure, a micro line-width of electrode can be narrowed, thereby increasing the aperture ratio and brightness by virtue of the micro electrode and improving the productivity due to the reduction of the etch time.

In accordance with the LCD device and the fabrication method thereof according to an embodiment of the present invention, since the dual layer in the structure of the metal layer and the inorganic insulation layer including the metal insulation layer for forming electrodes is etched so as to implement uniform micro lines, and also an external exposure of the metal layer is prevented by the metal insulation layer to thereby decrease damages on the metal layer.

Although the existing single metal electrode according to the related art has generated the rainbow spot phenomenon due to high reflectivity, the present invention addresses this limitation and according to an embodiment of the invention, a metal electrode in the dual layer structure of the metal layer and the metal insulation layer used in the present invention has low reflectivity, so that it can be used as a low-reflective electrode. For instance, the metal insulation layer has a light reflectivity lower than that of the metal layer and, accordingly, it can function to reduce the reflectivity by being located on the metal layer with the high reflectivity. Hence, the metal electrode in the dual layer structure of the metal layer and the metal insulation layer can be applied as the low-reflective electrode.

The present invention may also be applicable to a low-reflective electrode for solar cell, metal lines including micro electrodes for a semiconductor device or metal lines including micro electrodes for other display devices, as well as the various metal lines including pixel electrodes of the LCD device.

According to an embodiment, the invention provides a liquid crystal display device comprising: gate lines disposed on a substrate; data lines formed on the substrate and crossing the gate lines to define pixel regions; common lines disposed substantially in parallel to the gate lines; thin film transistors (TFTs) formed at intersections between the gate lines and the data lines, each of the TFTs including a gate electrode extending from the corresponding gate line, a gate insulation layer, an active layer, an ohmic contact layer, a source electrode extending from the corresponding data line and a drain electrode spaced apart from the source electrode; passivation layers, each of the passivation layers formed on the TFT and having a contact hole for exposing a part of the corresponding drain electrode; and pixel electrodes, each of the pixel electrodes composed of a conductive layer and an insulation layer formed on the corresponding passivation layer and electrically connected to the corresponding drain electrode via the corresponding contact hole.

According to an embodiment, the invention provides a method for forming a liquid crystal display device, the method comprising: forming gate lines on a substrate; forming data lines on the substrate, the data lines crossing the gate lines to define pixel regions; forming common lines substantially in parallel to the gate lines; forming thin film transistors (TFTs) at intersections between the gate lines and the data lines, each of the TFTs including a gate electrode extending from the corresponding gate line, a gate insulation layer, an active layer, an ohmic contact layer, a source electrode extending from the corresponding data line and a drain electrode spaced apart from the source electrode; forming passivation layers on the TFTs, each of the passivation layers having a contact hole for exposing a part of the corresponding drain electrode; and forming pixel electrodes, each of the pixel electrodes composed of a conductive layer and an insulation layer formed on the corresponding passivation layer and electrically connected to the corresponding drain electrode via the corresponding contact hole.

According to an embodiment, the invention provides a method for fabricating a liquid crystal display device, the method comprising: forming, on a substrate, a gate line having a gate electrode and a common line disposed substantially in parallel to the gate line and having a common electrode; forming a gate insulation layer on the substrate having the gate electrode; forming a semiconductor layer on the gate electrode by interposing the gate insulation layer between the gate electrode and the semiconductor layer, the semiconductor layer comprising an active layer and an ohmic contact layer and having a channel region; forming, on the semiconductor layer, a data line crossing the gate line to define a pixel region, a source electrode extending from the data line and a drain electrode spaced apart from the source electrode; forming a passivation layer on the substrate having the source electrode, the drain electrode and the data line; forming a contact hole by patterning the passivation layer, the contact hole exposing a part of the drain electrode; depositing a conductive material layer and an insulation material layer on the passivation layer, the conductive material layer contacting the drain electrode via the contact hole; and etching portions of the conductive material layer and the insulation material layer to form a conductive layer and an insulation layer, the conductive layer and the insulation layer constituting a pixel electrode.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Description will now be given in detail of an LCD device in accordance with the preferred embodiments of the present invention, with reference to the accompanying drawings. For the sake of brief description with reference to the drawings, the same or equivalent components will be provided with the same reference numbers, and description thereof will not be repeated.

Figure 1:
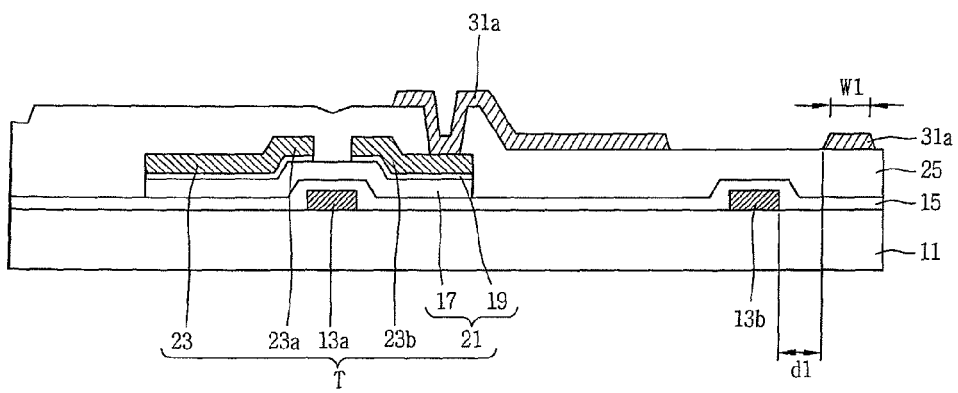
FIG. 1 is a sectional view schematically showing an LCD device structure according to a related art.
Figure 2A:
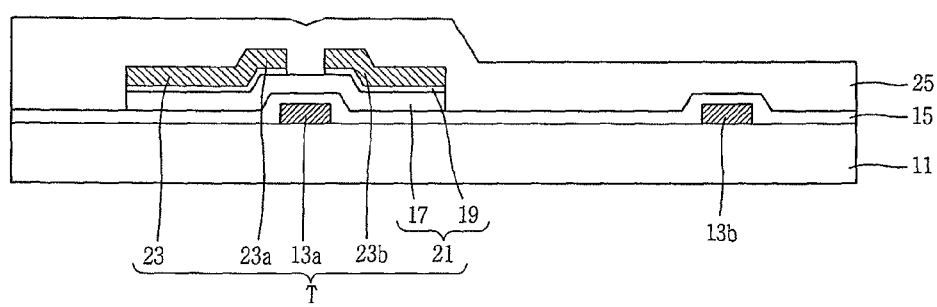
FIGS. 2A to 2E are sectional views showing sequential processes of a method for fabricating the LCD device of FIG. 1 according to the related art.
Figure 2B:
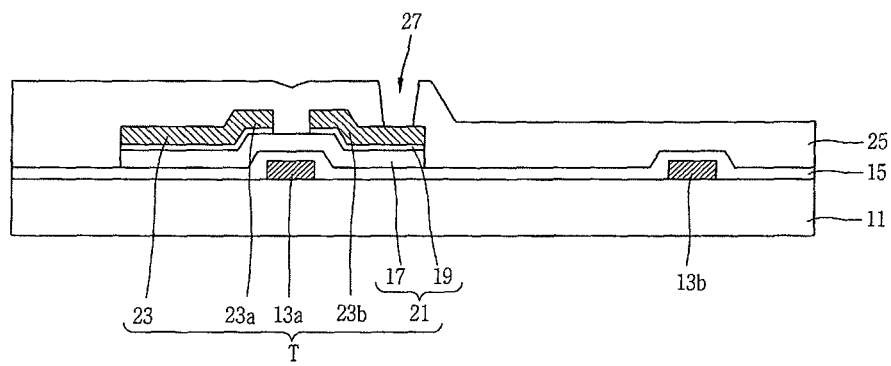
Figure 2C:
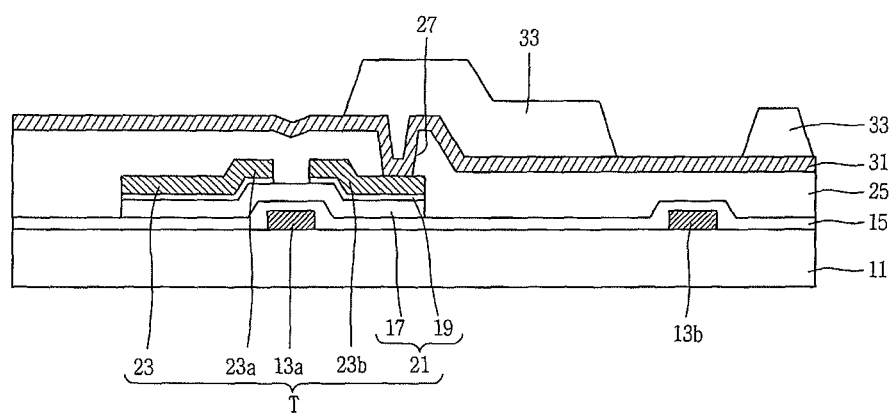
Figure 2D:
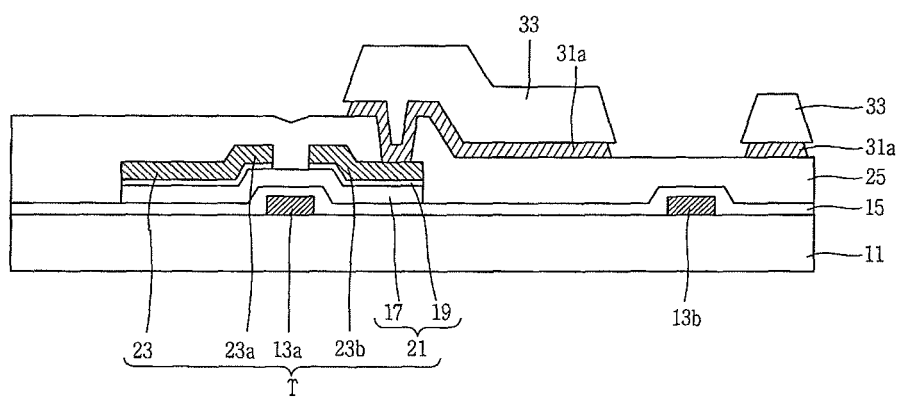
Figure 2E:
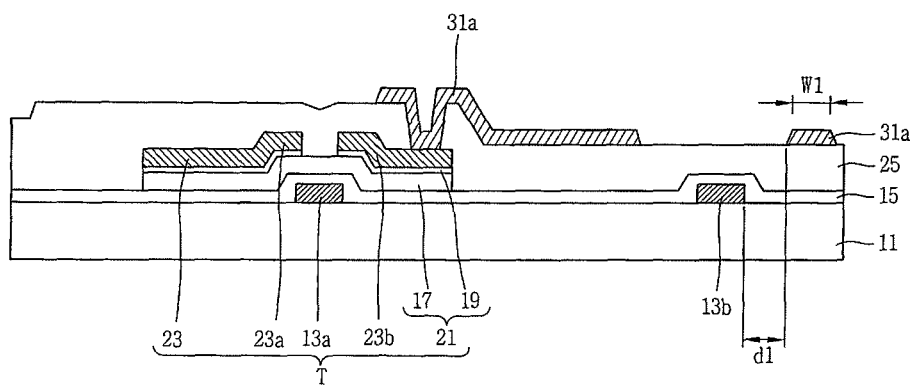
Figure 3:
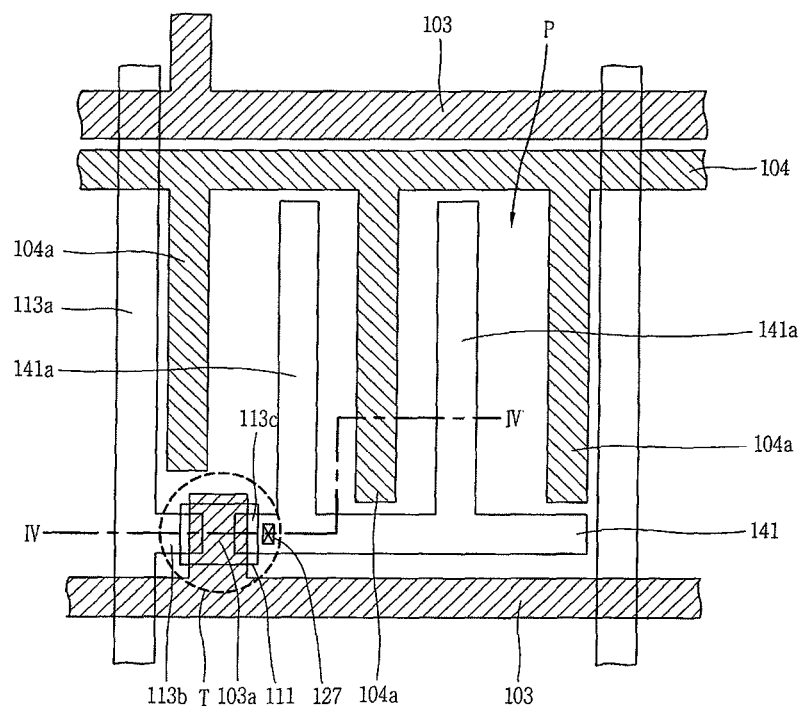
FIG. 3 is a sectional view showing a TFT array substrate for an LCD device in accordance with an embodiment of the present invention.

FIG. 3 is a sectional view showing a TFT array substrate for an LCD device in accordance with an embodiment of the present invention.

As shown in FIG. 3, an LCD device according to the present invention may include a plurality of gate lines 103 horizontally (or in one direction) disposed on an LCD display array substrate (see "101" in FIG. 4) in parallel and spaced apart from each other by predetermined gaps, common lines 104 disposed adjacent to the gate lines 103 to be in parallel to the gate lines 103, and a plurality of data lines 113a intersecting with (or crossing over/under) the gate lines 103 to define pixel regions P and extending in a vertical direction or a direction generally perpendicular to the direction of the gate lines 103.

A thin film transistor (TFT) may be formed at each intersection between the corresponding gate line 103 and the corresponding data line 113a within each pixel region P. The TFT may include a gate electrode 103a diverged from the gate line 103, a gate insulation layer 105 (FIG. 4) on the gate electrode 103a, a semiconductor layer 111 formed on the gate insulation layer 105 and provided with an active layer 107 and an ohmic contact layer 109 (FIG. 4), and a source electrode 113b and a drain electrode 113c formed on the semiconductor layer 111 in a contacted state. Here, the source electrode 113b extends from the data line 113a.

A plurality of common electrodes 104a extending from the common line 104, which is formed adjacent to the gate line 103 in parallel to each other, may be formed within each pixel region P to be in parallel to the data lines 113a. A plurality of pixel electrodes 141a may alternate with the plurality of common electrodes 104a such that each pixel electrode 141a is located between two of the adjacent common electrodes 104a. Here, the plurality of pixel electrodes 141a may extend from a pixel electrode line 141 connected to the drain electrode 113c. The plurality of pixel electrodes 141a come in contact with the drain electrode 113c via a contact hole 127.

Figure 4:
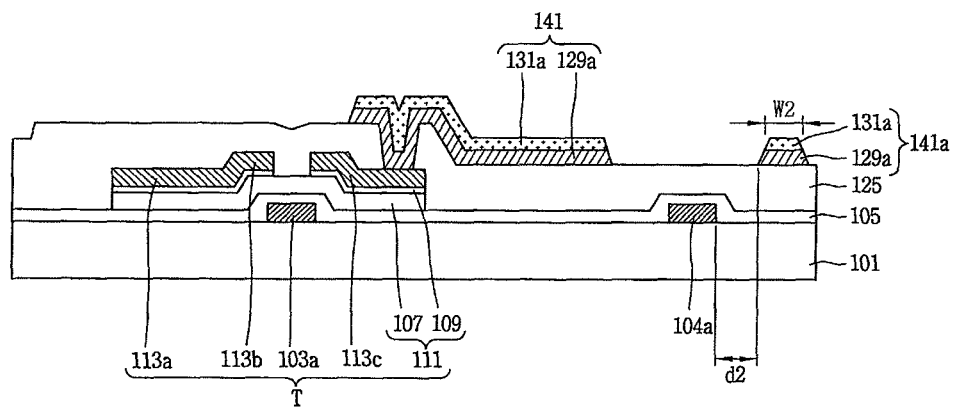
FIG. 4 is a cut-out sectional view taken along the line IV-IV of FIG. 3, which schematically shows a structure of the LCD device according to an embodiment of the present invention.

FIG. 4 is a cut-out sectional view taken along the line IV-IV of FIG. 3, which schematically shows a structure of the LCD device according to an embodiment of the present invention.

Herein, the present invention will be described based upon the structure of the pixel electrode of the LCD device; however, it should be understood that the present invention may be equally applicable to structures of other metal lines, for example, the gate line including the gate electrodes, the common line, or the data lines including source and drain electrodes. Also, the present invention will be applied to other devices, in addition to the metal line of the LCD device. Examples of the other devices may include a semiconductor device using metal electrodes or metal lines with micro line-widths, other types of display devices, a low-reflective electrode for a solar cell and the like.

In the structure of the LCD device according to an embodiment of the present invention, as shown in FIG. 4, the gate electrode 103a extending from the gate line (see "103" in FIG. 3) and the common electrode 104a extending from the common line (see "104" in FIG. 3) are formed on the substrate 101. The gate insulation layer 105 is then formed on the entire surface of the substrate 101. The semiconductor layer 111 having the active layer 107 and the ohmic contact layer 109 is formed on the gate insulation layer 105 to correspond to the gate electrode 103a. Here, the gate electrode 103a extending from the gate line and the common electrode 104a are also formed. Also, the gate line and the common line may be configured in a single layer structure, a dual layer structure or a triple layer structure; however, the drawings show the single layer structure for the sake of brief description. Here, the dual layer structure may have a deposited structure of a conductive layer and an inorganic insulation layer, and the triple layer structure may have a deposited structure of two conductive layers and an inorganic insulation layer. Here, the dual layer may be formed of one or more conductive materials, which are selected from a conductive metal group including molybdenum titanium (MoTi), aluminum (Al), aluminum alloy, chrome (Cr), tungsten (W) and copper (Cu), or selected from ITO, AZO, ZnO, IZO or other transparent metals.

The inorganic insulation layer may be made of a material selected from inorganic insulating materials, including metal nitrides, metal oxides, nitrides and oxides. Here, metals included in the metal nitrides and the metal oxides may include Cu, Al, Al alloy, Cr, W or MoTi. The active layer 107 may be made of pure amorphous silicon (a-Si:H), and the ohmic contact layer 109 may be made of impure amorphous silicon (n+a-Si).

The data line 113*a* is formed on the gate insulation layer 105 to cross over with the gate line and the common line. The source electrode 113*b* and the drain electrode 113*c* are formed on the semiconductor layer 111. The source electrode 113*b* extends from the data line 113*a* and comes in contact with the semiconductor layer 111, and the drain electrode 113*c* is spaced apart from the source electrode 113*c* and also comes in contact with the semiconductor layer 111. Here, the construction including the data line 113*a*, the source electrode 113*b* and the drain electrode 113*c* may be realized in a dual or triple layer structure; however, the drawings show the single layer structure for the sake of brief description. The dual layer structure may have a deposited structure of a conductive layer and an inorganic insulation layer, and the triple layer structure may have a deposited structure of two conductive layers and an inorganic insulation layer. Here, the dual layer may be formed of one or more conductive materials, which are selected from a conductive metal group including molybdenum titanium (MoTi), aluminum (Al), Al alloy, chrome (Cr), tungsten (W) and copper (Cu), or selected from ITO, AZO, ZnO, IZO or other transparent metals.

The inorganic insulation layer may be made of a material selected from inorganic insulating materials, including metal nitrides, metal oxides, nitrides and oxides. Here, metals included in the metal nitrides and the metal oxides may include Cu, Al, Al alloy, Cr, W or MoTi.

A passivation layer 125 having a contact hole is deposited on the source and drain electrodes 113*b* and 113*c* and the entire surface of the exposed gate insulation layer 105. The plurality of pixel electrodes 141*a*, which extend from the pixel electrode line 141 and come in contact with the drain electrode 113*c* via the contact hole 127, are formed on the passivation layer 125 to alternate with the plurality of common electrodes 104*a*. Here, the plurality of pixel electrodes 141*a* may be located on the passivation layer 125 as shown in the drawing; however, although not shown, they may be formed on the gate insulation layer on which the source and drain electrode are formed.

Here, each of the pixel electrodes 141*a* and the pixel electrode line 141 has a deposited structure of a conductive layer pattern 129*a* and an inorganic insulation layer pattern 131*a*. Here, the material of the conductive layer pattern 129*a* may be one or more selected from a conductive metal group, which includes, e.g., molybdenum titanium (MoTi) alloy, aluminum (Al), Al alloy, chrome (Cr), tungsten (W) and copper (Cu), or selected from ITO, AZO, ZnO, IZO or other transparent metals. The material of the inorganic insulation layer 131*a* may be selected from inorganic insulating materials, including, e.g., metal nitrides, metal oxides, nitrides and oxides. Here, metals included in the metal nitrides and the metal oxides may include, e.g., Cu, Al, Al alloy, Cr, W or MoTi.

Although not shown in FIG. 4, a color filter substrate (see "151" in FIG. 5N) may be disposed above the transparent substrate 101 as the TFT array substrate with a predetermined gap, and a liquid crystal layer (see "161" in FIG. 5N) may interpose therebetween.

Hereinafter, a method for fabricating the thusly-configured LCD device according to an embodiment of the present invention will be described with reference to FIGS. 5A to 5N. The methods of FIGS. 5A to 5N are used to form the LCD device of FIGS. 3 and 4, but can be used to other devices.

Figure 5A:
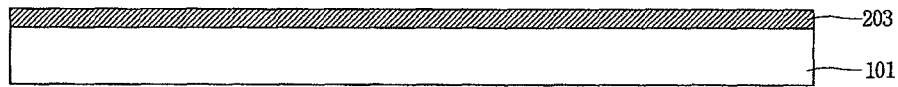
FIGS. 5A to 5N are sectional views showing sequential processes of a method for fabricating the LCD device in accordance with an embodiment of the present invention.
Figure 5B:
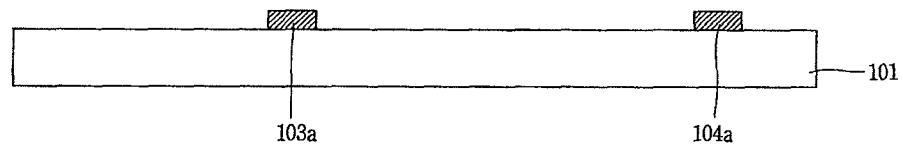
Figure 5C:
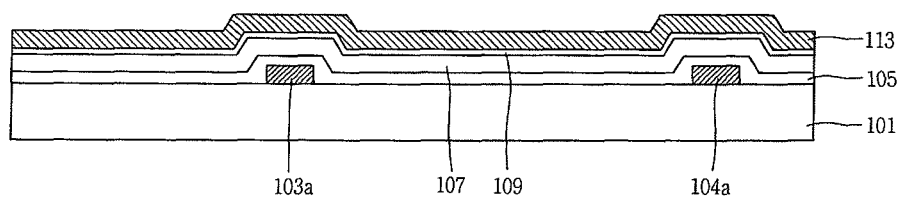
Figure 5D:
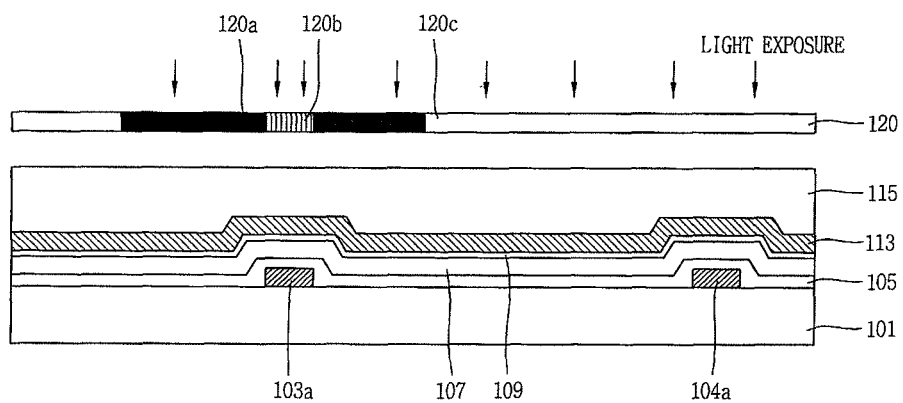
Figure 5E:
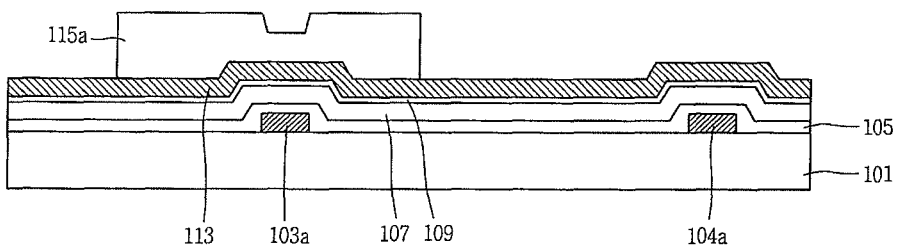
Figure 5F:
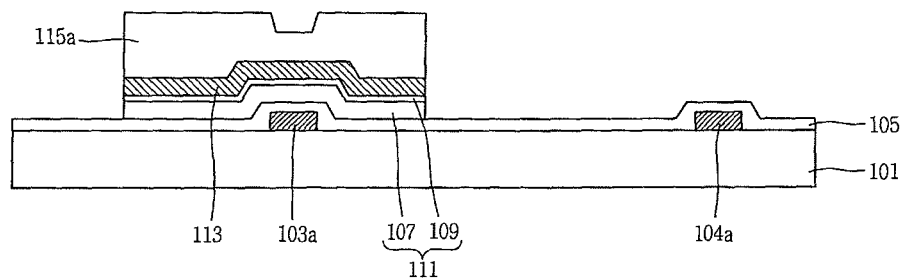
Figure 5G:
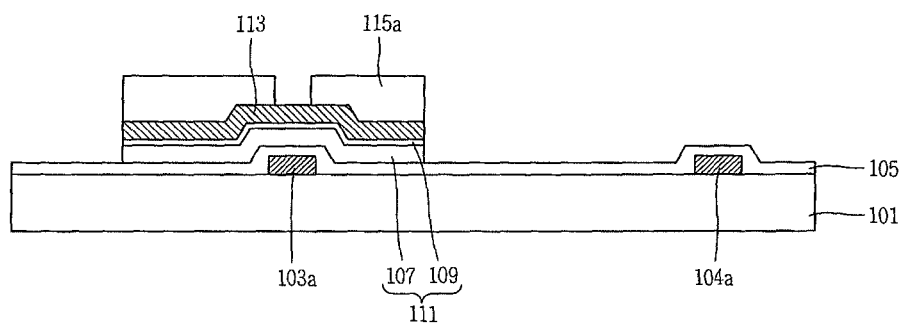
Figure 5H:
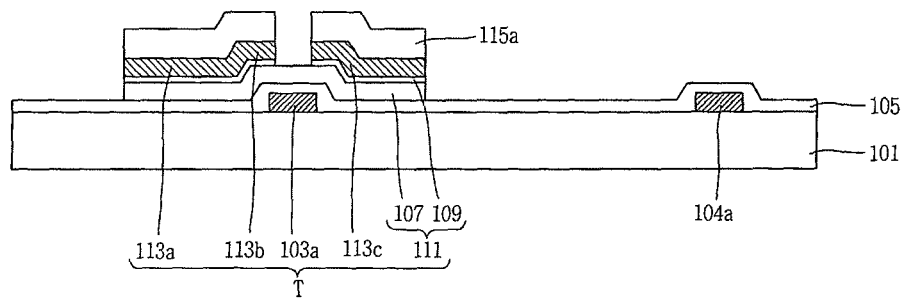
Figure 5I:
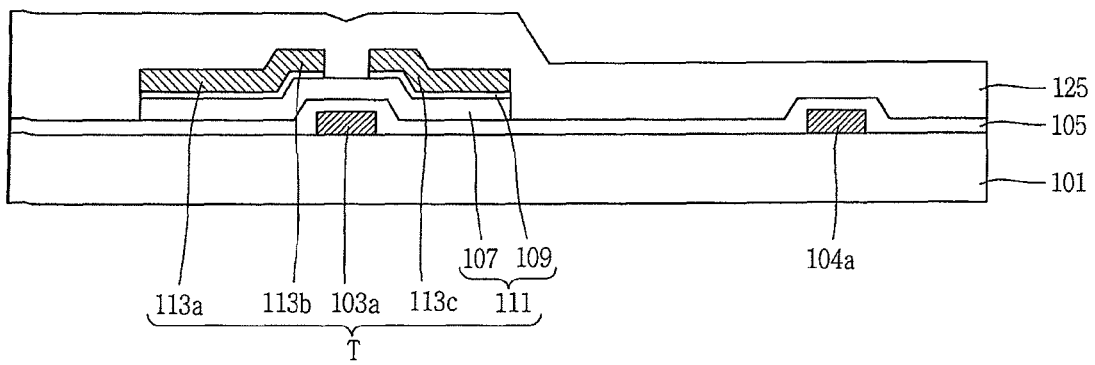
Figure 5J:
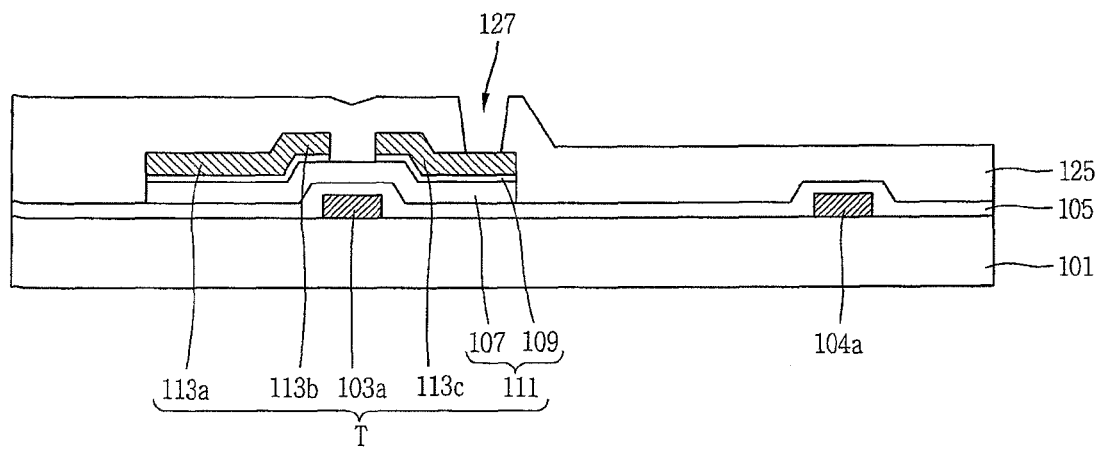
Figure 5K:
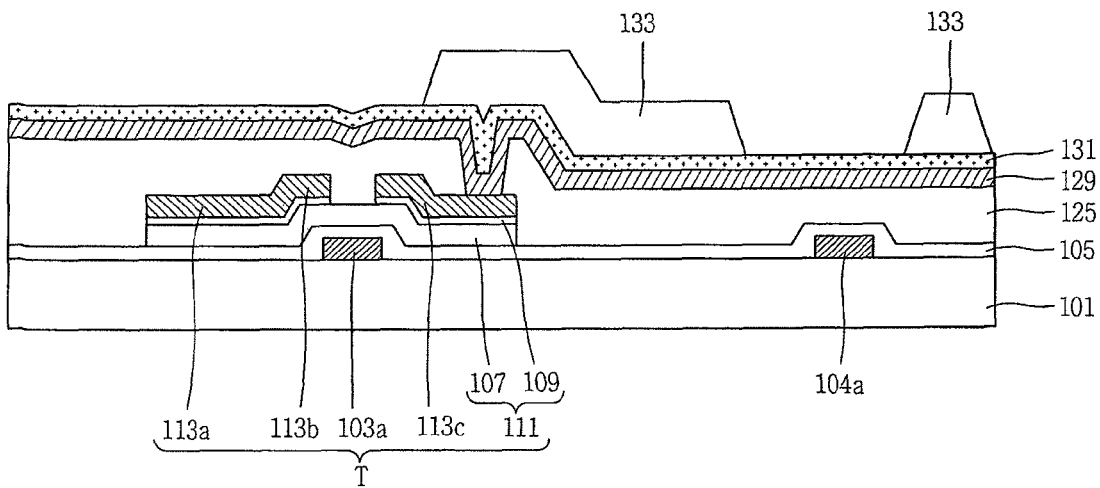
Figure 5L:
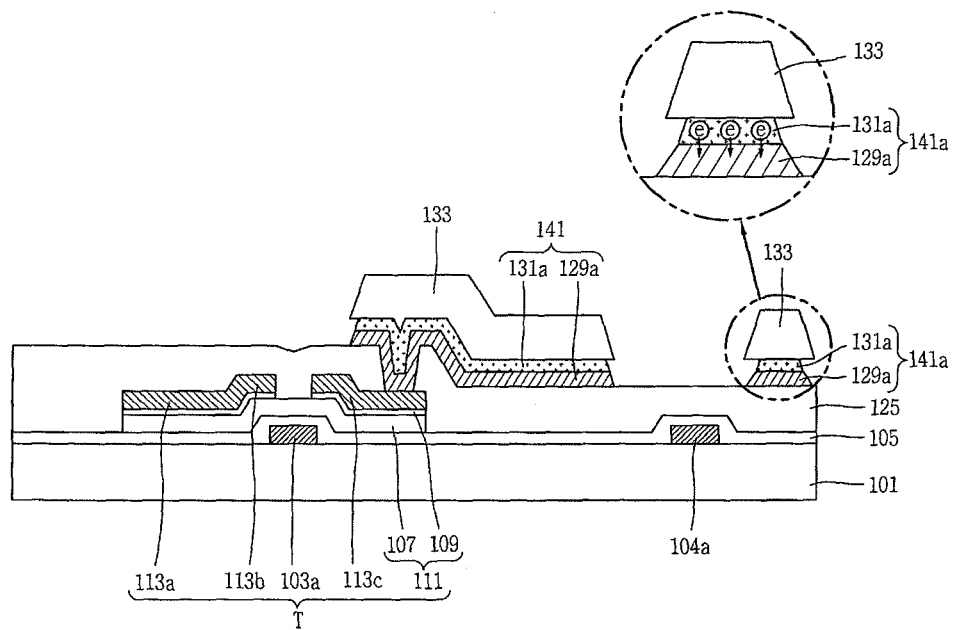
Figure 5M:
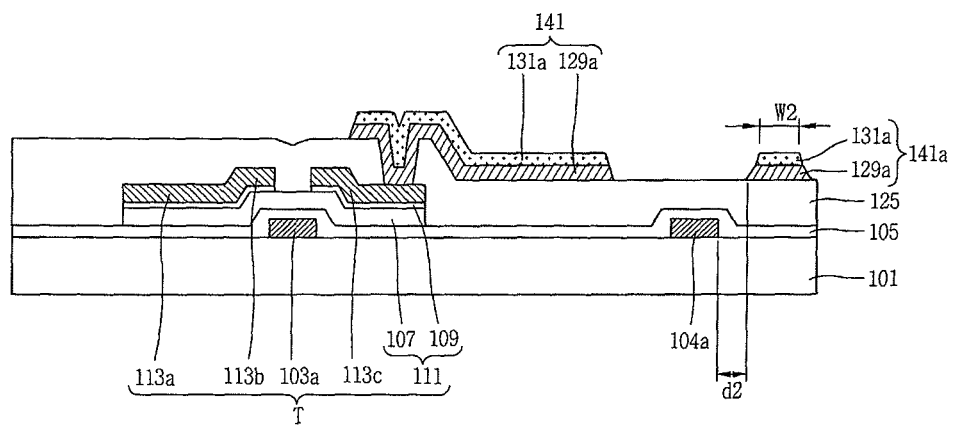
Figure 5N:
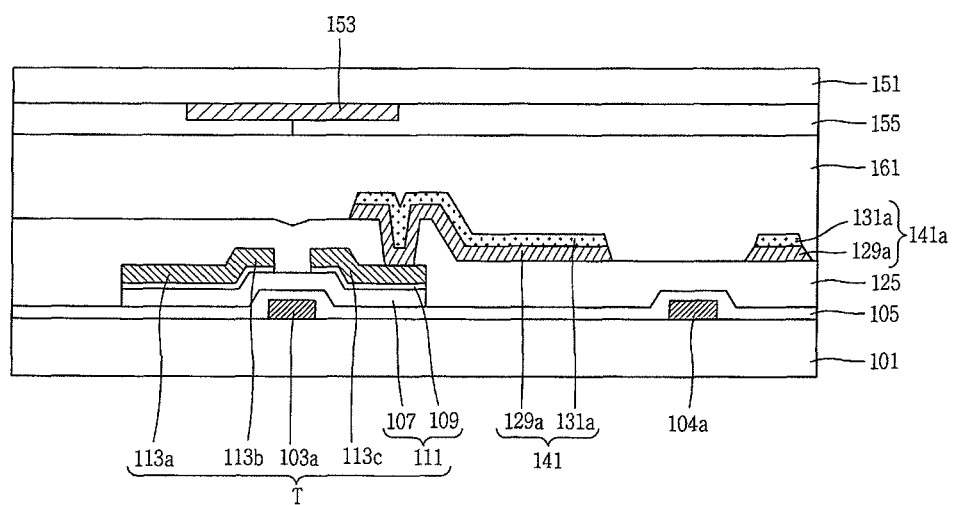

FIGS. 5A to 5N are sectional views showing sequential processes of a method for fabricating an LCD device in accordance with an embodiment of the present invention. Although the sequential processes are discussed, these processes may be performed in a different order as needed.

Herein, an embodiment of the present invention will be described based upon the structure of the pixel electrode of the LCD device; however, it should be understood that the present invention may be equally applicable to structures of other metal lines, for example, the gate line including the gate electrodes, the common line, or the data lines including source and drain electrodes. Also, the present invention will be applied to other devices, in addition to the metal line of the LCD device. Examples of the other devices may include a semiconductor device using metal electrodes or metal lines with micro line-widths, other types of display devices, a low-reflective electrode for a solar cell and the like.

As shown in FIG. 5A, one or more metals, which are selected from a conductive metal group including, e.g., Al, Al alloy, Cr, W, MoTi, Cu and the like, are printed or formed on the transparent substrate 101, thereby forming a conductive layer 203. Here, the conductive layer 203 may be configured in a single layer structure, a dual layer structure, a triple layer structure, or other format; however, the present invention will be described based upon the single layer structure for brief description. Further, the dual layer structure may have a deposited structure of a conductive layer and an inorganic insulation layer, and the triple layer structure may have a deposited structure of two conductive layers and an inorganic insulation layer. Here, the dual layer may be formed of one or more conductive materials, which are selected from a conductive metal group including, e.g., MoTi alloy, Al, Al alloy, Cr, W and Cu, or selected from ITO, AZO, ZnO, IZO or other transparent metals.

The inorganic insulation layer may be made of a material selected from inorganic insulating materials, including, e.g., metal nitrides, metal oxides, nitrides and oxides. Here, metals included in the metal nitrides and the metal oxides may include, e.g., Cu, Al, Al alloy, Cr, W or MoTi.

A first photosensitive layer is then coated on the conductive layer 203 and then selectively removed through a lithography process using an exposure mask and a developing process, thereby forming a first photosensitive layer pattern.

Afterwards, as shown in FIG. 5B, the conductive layer 203 is selectively etched through an etching process using the first photosensitive layer pattern as a barrier layer, thereby forming the gate line (see "103" in FIG. 3), the gate electrode 103*a* protruding from the gate line 103, the common line (see "104" in FIG. 3) and the common electrode 104*a* extending from the common line 104.

As shown in FIG. 5C, the first photosensitive layer pattern is removed, and then the gate insulation layer 105 is formed by printing or coating one material, selected from an inorganic insulating material group including, e.g., silicon oxide (SiO$_2$) and silicon nitride (SiNx), and, in some cases, from an organic insulating material group including, e.g., benzocyclobutene and acryl-based resin, on the entire surface of the substrate 101 having the gate electrode 103a and the common electrode 104a.

Then, an active layer 107 composed of, e.g., amorphous silicon (a-Si:H) and an ohmic contact layer 109 composed of, e.g., impure amorphous silicon from which impurity is doped are sequentially formed on the gate insulation layer 105.

A conductive material is sputtered on the ohmic contact layer 109, thereby forming the conductive layer 113. Here, the conductive layer 113 may use one or more materials, selected from a metal group including, e.g., MoTi, tantalum (Ta), Cr, nickel (Ni), indium (In), Mo, Ti, Cu, Al and Al alloy, or one or more selected from ITO, AZO, ZnO, IZO or other transparent metals.

The conductive layer 113 may be configured in a single layer structure, a dual layer structure or a triple layer structure; however, the drawings show the single layer structure for the sake of brief description. Here, the dual layer structure may have a deposited structure of a conductive layer and an inorganic insulation layer, and the triple layer structure may have a deposited structure of two conductive layers and an inorganic insulation layer. Here, the dual layer may be formed of one or more conductive materials, which are selected from a conductive metal group including, e.g., MoTi, Al, Al alloy, Cr, W and Cu, or selected from ITO, AZO, ZnO, IZO or other transparent metals. The inorganic insulation layer may be made of a material selected from inorganic insulating materials, including metal nitrides, metal oxides, nitride and oxide. Here, metals included in the metal nitrides and the metal oxides may include Cu, Al, Al alloy, Cr, W or MoTi.

Referring to FIGS. 5D and 5E, a second photosensitive layer 115 is coated on the conductive layer 113 and then processed by lithography and developing processes through photolithography using a diffraction mask 120, thereby forming a second photosensitive layer pattern 115a.

Here, the diffraction mask 120 may be a slit mask or a half-tone mask. Alternatively, a typical mask may be used instead of the diffraction mask 120.

The diffraction mask 120 may include a non-transparent region 120a, a semi-transparent region 120b and a transparent region 120c. A thickness of the second photosensitive layer pattern 115a which is left after undergoing lithography and development through the semi-transparent region 120b is thinner than that of the second photosensitive layer pattern 115a which is left after undergoing lithography and development through the non-transparent region 120a. A portion of the second photosensitive layer pattern 115a located below the semi-transparent region 120b corresponds to a channel region of a TFT, and a portion thereof located below the non-transparent region 120a corresponds to the source/drain region of the TFT.

As shown in FIG. 5F, the conductive layer 113, the ohmic contact layer 109 and the active layer 107 are sequentially etched out by using the second photosensitive layer pattern 115a as a barrier layer.

As shown in FIG. 5G, a portion of the second photosensitive layer pattern 115a is removed by a predetermined thickness through an ashing process so as to expose an upper surface of the conductive layer 113 aligned at a position corresponding to the channel region.

As shown in FIG. 5H, the exposed portion of the conductive layer 113 is selectively etched out by using the ashed second photosensitive layer pattern 115a as a mask, thereby forming the data line 113a perpendicularly intersecting with or crossing the gate line to define a pixel region, the source electrode 113b protruding from the data line 113a upward one side of the gate electrode 103a, and the drain electrode 113c spaced apart from the source electrode 113b by a predetermined gap. Here, upon the etching of the conductive layer 113 located at the channel region, the lower ohmic contact layer 109 is simultaneously partially etched out.

As shown in FIG. 5I, after removing the second photosensitive layer pattern 115a, a material selected from an organic insulating material group, or, in some cases, from an inorganic insulating material group is printed or formed on the entire surface of the substrate 101 having the data line 113a and the source and drain electrodes 113b and 113c, thereby forming a passivation layer 125. A third photosensitive layer is then coated on the passivation layer 125. Here, the passivation layer 125 may be formed by printing or coating one material selected from an inorganic insulating material group including, e.g., silicon oxide (SiO$_2$) and silicon nitride (SiNx), and, in some cases, from an organic insulating material group including, e.g., benzocyclobutene and acryl-based resin. The third photosensitive layer then undergoes lithography and development processes through the photolithography, thereby forming a third photosensitive layer pattern (not shown).

As shown in FIG. 5J, the passivation layer 125 is selectively etched out by using the third photosensitive layer pattern as a mask, thereby forming the contact hole 127 for exposing a portion of the drain electrode 113c.

As shown in FIG. 5K, after removing the third photosensitive layer pattern, the conductive layer 129 is sputtered on the passivation layer 125 having the contact hole 127. Here, as the material of the conductive layer 129, one or more materials may be selected from a conductive metal group including, e.g., MoTi, Al, Al alloy, Cr, W and Cu, or selected from, e.g., ITO, AZO, ZnO, IZO or other transparent metals.

Then an inorganic insulating material is deposited on the conductive layer 129 through a chemical vapor deposition method (CVD) or other deposition mechanisms, thereby forming an inorganic insulation layer 131. Here, the material of the inorganic insulation layer 131 may be one selected from inorganic insulating materials including, e.g., metal nitrides, metal oxides, nitrides and oxides. Here, metals included in the metal nitrides and the metal oxides may be include Cu, Al, Al ally, Cr, W or MoTi. Also, it is appropriate for the inorganic insulating layer 131 to be deposited as thick as allowing smooth wet etching of the lower conductive layer 129.

Next, a photosensitive material is coated on the inorganic insulation layer 131, thereby forming a fourth photosensitive layer (not shown).

Afterwards, an exposure mask (not shown) for defining a position where a pixel electrode is to be formed is disposed on the fourth photosensitive layer, and lithography and development for emitting infrared light to the fourth photosensitive layer through the exposure mask are executed, thereby forming a fourth photosensitive layer pattern 133.

As shown in FIG. 5L, the inorganic insulation layer 131 and the conductive layer 129 are selectively etched out through wet etching by using the fourth photosensitive layer pattern 133 as a barrier layer, thereby forming both the pixel electrode line 141 including a conductive layer pattern 129a and an inorganic insulation layer pattern 131a and the pixel electrode 141a extending from the pixel electrode line 141. For instance, by using the fourth photosensitive layer pattern 133, both the pixel electrode line 144 and the pixel electrode 141a can be simultaneously formed.

Here, while executing the wet etching, since the inorganic insulation layer 131 containing a metal component has been deposited on the conductive layer 129, the conductive layer 129 acts as an anode and the inorganic insulation layer 131 acts as a cathode, and accordingly electrodes move from the inorganic insulation layer 131 to the conductive layer 129. Accordingly, the etching of the inorganic insulation layer 131, which has lost the electrons, is accelerated due to a galvanic effect. Consequently, as shown in an example of FIG. 8, the inorganic insulation layer 131 represents a larger bias than the conductive layer 129 and the anodic conductive layer 129 is quickly corroded, thereby allowing fast etching of the side surface of the conductive layer 129. That is, the electron movement becomes fast due to the difference of corrosion potential, namely, electromotive-force between metal dual layers, for example, between a metal layer made of MoTi and a metal insulation layer made of CuNx. Hence, the dual layer structure of the conductive layer 129 and the inorganic insulation layer 131 of the present invention allows a fast etching due to the galvanic effect. Therefore, the etching process time taken when forming the pixel electrode having the metal dual layer, namely, the conductive layer and the inorganic insulation layer, can be shortened and formation of micro electrodes or other micro metal lines with micro line-widths can be allowed effectively.

Therefore, if an etching process is executed in a state where the inorganic insulation layer 131 is deposited on the conductive layer 129, the etching speed is faster than that in case of merely etching the existing single conductive layer, whereby patterning for forming electrodes or lines can become uniform and process time can be decreased.

Hereinafter, an etching principle for the dual layer structure including the conductive layer 129 and the inorganic insulation layer 131 according to the invention will briefly be described with reference to FIGS. 6 and 7.

Figure 6:
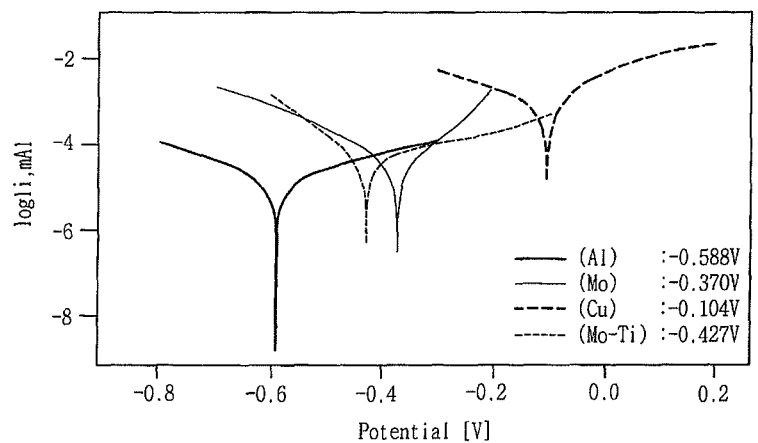
FIG. 6 is a graph showing an examples of a distribution of corrosion potentials for each metal, in the method for fabricating the LCD device according to an embodiment of the present invention.

FIG. 6 is a graph showing an example of a distribution of corrosion potentials for each metal, in the method for fabricating the LCD device according to an embodiment of the present invention.

Figure 7:
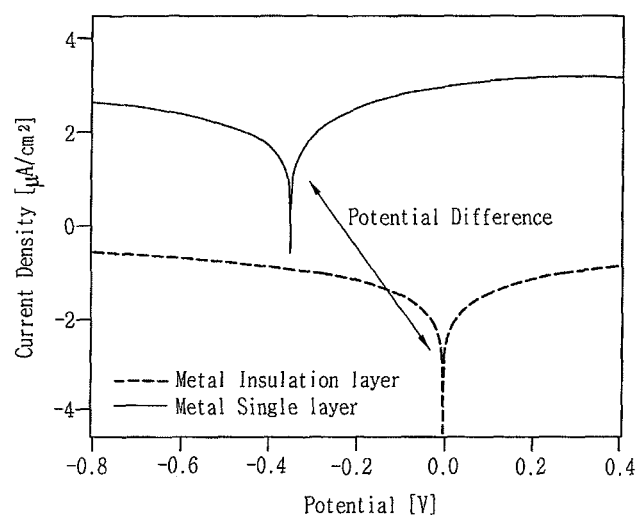
FIG. 7 is a graph showing an example of current densities depending on potentials of a metal layer and a metal insulation layer in the method for fabricating the LCD device according to an embodiment of the present invention, which schematically shows a potential difference between the metal layer and the metal insulation layer.

FIG. 7 is a graph showing an example of current densities depending on potentials of a metal layer and a metal insulation layer in the method for fabricating the LCD device according to an embodiment of the present invention, which schematically shows a potential difference between the metal layer and the metal insulation layer.

For a single metal layer, a corrosion potential is about −0.35 and the corrosion potential of the metal insulation layer is about −0.025. However, for the dual layer structure of the metal layer and the metal insulation layer employed in the present invention, the corrosion potential is about 0.084.

Hence, a metal is hard to be etched if the corrosion potential of the metal insulation layer becomes high, and the metal is apt to corrode quickly at a low corrosion potential. Consequently, in case of a large corrosion potential difference between the metal layer and the metal insulation layer, corrosion may easily happen.

Referring to FIG. 6, Al or MoTi has a lower corrosion potential than Mo or Cu, such material may easily corrode.

Also, referring to FIG. 7, the large corrosion potential difference between a metal layer, e.g., MoTi, having a low corrosion potential and a metal insulation layer, e.g., CuNx, having a high corrosion potential well induces the galvanic effect, thereby enabling the metal layer and the metal insulation layer to be fast etched.

Therefore, when etching a dual metal layer for using as electrodes, the conductive layer 129 acts as an anode and the inorganic insulation layer 131 acts as a cathode, and accordingly electrodes move from the inorganic insulation layer 131 to the conductive layer 129. Accordingly, the etching of the inorganic insulation layer 131, which has lost the electrons, is accelerated due to the galvanic effect. Consequently, the inorganic insulation layer 131 represents a larger bias than the conductive layer 129 and the anodic conductive layer 129 quickly corrodes, thereby allowing fast etching of the side surface of the conductive layer 129. That is, the electron movement becomes fast due to the difference of corrosion potentials, namely, electromotive-forces between the dual metal layers, for example, between a metal layer made of MoTi and a metal insulation layer made of CuNx.

Thus, the deposited structure of the conductive layer 129 and the inorganic insulation layer 131 as the dual metal layer is allowed to be quickly etched due to the galvanic effect. Consequently, the etching process time taken when forming the pixel electrode having the dual metal layer, namely, the conductive layer and the inorganic insulation layer of the invention, can be shortened and formation of micro electrodes or other micro metal lines with micro line-widths can be allowed advantageously.

As such, the present invention allows the micro electrode formation by decreasing the etch time. Accordingly, a micro line-width w2 of a pixel electrode can be reduced more than that in a general LCD device, thereby improving an aperture ratio and enhancing overall brightness.

In addition, the present invention allows formation (patterning) of micro electrodes, for example, pixel electrodes and common electrodes, having the micro line-widths w2, so as to increase the number of pixel electrodes and common electrodes located within a unit pixel region.

Accordingly, the present invention can increase the strength of an electric field by further narrowing a distance d2 between a pixel electrode and a common electrode, as compared to a distance therebetween in a general LCD device, with maintaining the aperture ratio. Hence, the reaction speed of the LCD device according to the invention can be increased by raising reactivity of liquid crystal, which reacts with the electric field.

Meanwhile, a single-layer MoTi layer shows about 61% light reflectivity and about 31% light absorption, which represents high reflectivity thereof. As shown in the present invention, if CuNx as the metal insulation layer is deposited on the single MoTi layer to form a dual layer structure, the reflectivity can remarkably be reduced. That is, since CuNx has about 33% light reflectivity and about 64% light absorption, it can function to reduce the reflectivity on the MoTi with the high reflectivity. Hence, the metal electrode in the dual layer structure of the metal layer and the metal insulation layer may be applicable as a low-reflective electrode.

Also, the wet etching process may be executed by using a chemical etching solution depending on a thin film material of a conductive layer or executed in a manner of plasma etching or reactive ion etching (RIE). Particularly, for removing the conductive layer, a mixed solution of nitrogen acid, hydrochloric acid and acetic acid in a preset concentration ratio may be used. Here, an etching solution used for the wet etching may be another type of etching solution other than the aforesaid solution.

Referring to FIG. 5M, the remaining fourth photosensitive layer pattern 133 is removed so as to form the pixel electrode line 141 including the conductive layer pattern 129a and the inorganic insulation layer pattern 131a and the pixel electrode 141a extending from the pixel electrode line 141, thereby completing the fabrication process of the TFT array substrate.

Afterwards, referring to FIG. 5N, a black matrix layer 153 for blocking light is formed on a transparent color filter substrate 151, and also a color filter layer 155 is formed on the color filter substrate 151 located between the black matrix layers 153.

A process for forming a liquid crystal layer 161 between the color filter substrate 151 and the TFT array substrate 101 is further performed, thereby completing the fabrication of the LCD device. Although a specific example of forming the color filter substrate 151 has been discussed referring to FIG. 5N, the invention is not limited thereto and equally applies to other LCD device or other displays having other structures.

Figure 8:
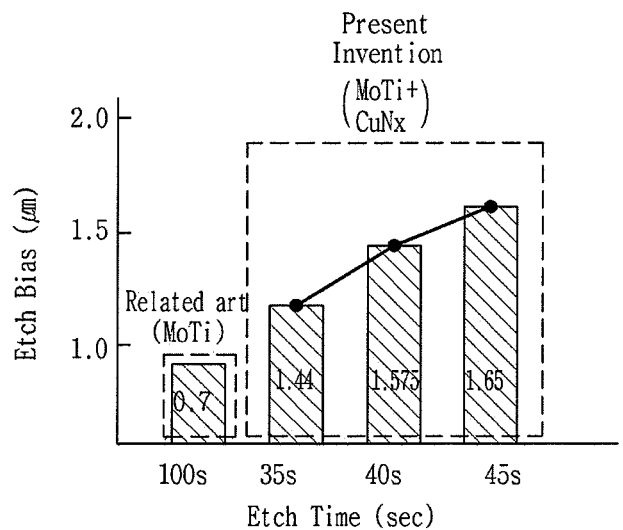
FIG. 8 is a graph showing examples of an etch bias according to an etch time, in case of using a dual layer composed of molybdenum titanium (MoTi) and copper nitride (CuNx) of the invention according to a method for fabricating the LCD device according to the invention, and in case of using the existing single layer composed of molybdenum titanium (MoTi) alloy according to the related art.

In the meantime, FIG. 8 is a graph showing an example of an etch bias according to an etch time, respectively, in case of using a dual layer composed of molybdenum titanium (MoTi) and copper nitride (CuNx) according to the present invention, and in case of using the existing single layer composed of molybdenum titanium (MoTi) according to the related art, in a method for fabricating an LCD device.

As shown in FIG. 8, in the related art, when an etch time for a single layer composed of MoTi is about 100 seconds, an etch bias is near 0.7 μm. However, according to an example of the present invention, when an etch time for a dual layer composed of MoTi and CuNx is about 35 to 45 seconds, it can be seen that the etch bias is greatly represented in the range of approximately 1.44 to 1.65 μm.

Hence, the etch bias of the dual layer composed of MoTi and CuNx according to one example of the present invention is in the range of approximately 1.44 to 1.65 μm. Such etch bias of the present invention is higher than that of the related art, whereby it can be understood that the etching process is executed within a shorter time than the related art. Consequently, the present invention allows the etching process for a shorter time than the related art, thereby enabling formation of micro electrodes with the micro line-widths w2.

Figure 9:
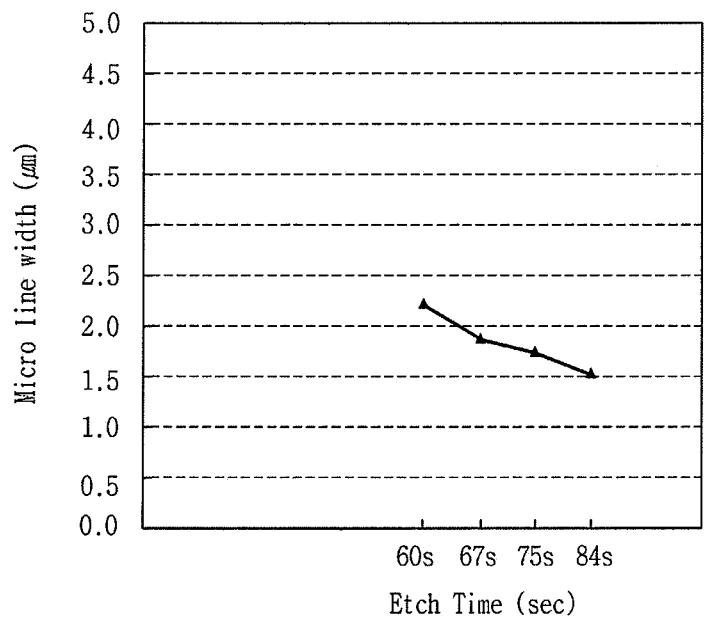
FIG. 9 is a graph showing an example of the change in a micro line-width w2 according to an etch time in case of using a dual layer composed of molybdenum titanium (MoTi) and copper nitride (CuNx), in the method for fabricating the LCD device according to an embodiment of the present invention.

FIG. 9 is a graph showing an example of the change in the micro line-width w2 according to an etch time in case of using a dual layer composed of molybdenum titanium (MoTi) and copper nitride (CuNx), in the method for fabricating the LCD device according to an embodiment of the present invention.

As shown in FIG. 9, in case where the etch time for a dual layer composed of MoTi and CuNx according to one embodiment of the present invention is about 60 to 84 seconds, it can be understood that a micro line-width is as narrow as in the range of approximately 2.3 to 1.50 μm.

Figure 10:
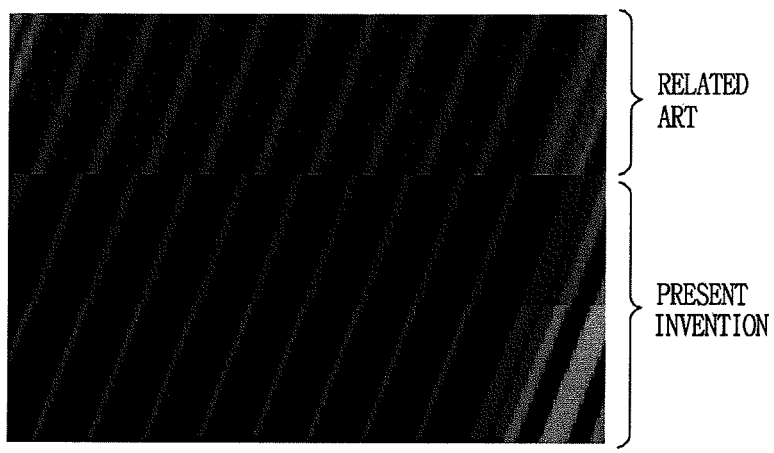
FIG. 10 is a photo showing examples of a changed state of the micro line-width w2 implemented according to the etch time, in case of employing a structure of a single layer including a metal layer according to the related art, and in case of employing a dual layer including a metal layer and a metal insulation layer in a method for fabricating the LCD device according to an embodiment of the present invention.

FIG. 10 is a photo showing examples of a changed state of the micro line-width w2 implemented according to the etch time, respectively, in case of employing a structure of a single layer including a metal layer according to a related art, and in case of employing a dual layer including a metal layer and a metal insulation layer in the method for fabricating the LCD device according to an embodiment of the present invention.

As shown in FIG. 10, when etching is executed for 100 seconds in the related art, a micro pattern with a micro line-width of about 2.6 μm is formed. However, it can be noticed that when etching for the dual layer composed of MoTi and CuNx is executed for about 40 seconds according to the present invention, a micro pattern with a micro line-width of about 2.0 μm is formed (see the upper portion of an area labeled 'Present Invention' in FIG. 10). In another example, when the etching therefor is executed for about 60 seconds according to the present invention, a micro pattern with a micro line-width of about 1.5 μm is formed (see the lower portion of the area labeled 'Present Invention' in FIG. 10).

Therefore, the present invention can quickly execute the etching process as compared to the related art and, accordingly, as the etch time becomes longer, the micro line-width can be narrower.

As described above, in the LCD device and the fabrication method thereof according to the embodiments of the invention, a dual layer in a structure including a metal layer and a metal insulation layer is etched so as to be used as a pixel electrode, whereby a faster etching speed can be obtained as compared to a single metal layer and accordingly micro electrodes with a high aperture ratio or micro lines with micro line-widths can be formed.

Since the present invention allows the formation of the micro electrodes by virtue of shortening an etch time, the micro line-width w2 of the pixel electrode can be reduced as compared to the related art, so as to improve the aperture ratio and overall brightness.

In addition, since the present invention allows the formation of the micro electrodes, for example, pixel electrodes and common electrodes, with micro line-widths w2, the number of pixel electrodes and common electrodes located within a unit pixel region can be increased.

Accordingly, the present invention can increase the strength of an electric field by further narrowing a distance d2 between a pixel electrode and a common electrode, as compared to a distance therebetween in a general LCD device, with maintaining the aperture ratio. Hence, the reaction speed of the LCD device according to the invention can be increased by raising reactivity of liquid crystal, which reacts with the electric field.

Therefore, the formation process of pixel electrodes or other metal lines of the LCD device according to the present invention can be executed more quickly and uniformly than in the related art. Accordingly, it can be expected to obtain a high aperture ratio due to the micro-patterning of electrodes and reduce an etch time taken for the micro-patterning.

In accordance with the LCD device and the fabrication method thereof according to the embodiments of the present invention, when forming pixel electrodes or other metal lines of the LCD device, the etching process can be executed in a state where a dual layer structure has been implemented by forming a metal layer and an inorganic insulation layer, such as metal oxide or metal nitride, on the metal layer, thereby ensuring a quick etch time as compared to a single metal layer structure of a general LCD device, resulting in he reduction of the etch time.

In accordance with the LCD device and the fabrication method thereof according to the embodiments of the present invention, since the quick etch time is obtained as compared to a general single metal layer structure, a micro line-width of electrode can be narrowed, thereby increasing the aperture ratio and brightness by virtue of the micro electrode and improving productivity due to the reduction of the etch time.

In accordance with the LCD device and the fabrication method thereof according to the embodiments of the present invention, since the dual layer in the structure of the metal layer and the metal insulation layer for forming electrodes is etched so as to implement uniform micro lines, and also an external exposure of the metal layer is prevented by the metal insulation layer to thereby decrease damages on the metal layer.

In addition, in accordance with the LCD device and the fabrication method thereof according to the embodiments of the present invention, the existing single metal electrode according to the related art generate the rainbow spot phenomenon due to high reflectivity. However, the metal electrode in the dual layer structure of the metal layer and the metal insulation layer used in the present invention has low reflectivity, so it can be used as a low-reflective electrode. That is, the metal insulation layer has light reflectivity lower than that of the metal layer, accordingly, it can function to reduce reflectivity by being located on the metal layer with the high reflectivity. Hence, the metal electrode in the dual layer structure of the metal layer and the metal insulation layer can be applied as the low-reflective electrode.

The present invention may also be applicable to a low-reflective electrode for solar cell, metal lines including micro electrodes for a semiconductor device or metal lines including micro electrodes for other display devices, as well as the various metal lines including pixel electrodes of the LCD device.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
gate lines disposed on a substrate;
data lines formed on the substrate and crossing the gate lines to define pixel regions;
common lines disposed substantially in parallel to the gate lines;
thin film transistors (TFTs) formed at intersections between the gate lines and the data lines, each of the TFTs including a gate electrode extending from the corresponding gate line, a gate insulation layer, an active layer, an ohmic contact layer, a source electrode extending from the corresponding data line and a drain electrode spaced apart from the source electrode;
passivation layers, each of the passivation layers formed on the TFT and having a contact hole for exposing a part of the corresponding drain electrode; and
pixel electrodes, each of the pixel electrodes having a dual layer structure composed of a metal conductive layer and a metal insulation layer formed on the corresponding passivation layer and electrically connected to the corresponding drain electrode via the corresponding contact hole,
wherein the metal conductive layer of each pixel electrode is made of molybdenum titanium (MoTi), and the metal insulation layer of each pixel electrode is made of one selected from copper nitride (CuN) and molybdenum titanium nitride (MoTiN).

2. The liquid crystal display device of claim 1, wherein for each TFT, the gate line, the common line, the data line or the source and drain electrodes has a dual layer structure composed of a metal layer and an inorganic insulation layer.

3. The liquid crystal display device of claim 2, wherein the metal layer is made of one or more materials selected from a conductive metal group including molybdenum titanium (MoTi), aluminum (Al), aluminum (Al) alloy, chrome (Cr), tungsten (W) and copper (Cu) or from transparent metals including ITO, AZO, ZnO and IZO,
wherein the inorganic insulation layer is made of one material selected from inorganic insulating materials including metal nitrides, metal oxides, ITO, nitrides and oxides, and
wherein a metal contained in the metal nitrides and the metal oxides is copper (Cu), aluminum (Al), aluminum (Al) alloy, chrome (Cr), tungsten (W) or molybdenum titanium (MoTi).

4. A liquid crystal display device comprising:
gate lines disposed on a substrate;
data lines formed on the substrate and crossing the gate lines to define pixel regions;
common lines disposed substantially in parallel to the gate lines;
thin film transistors (TFTs) formed at intersections between the gate lines and the data lines, each of the TFTs including a gate electrode extending from the corresponding gate line, a gate insulation layer, an active layer, an ohmic contact layer, a source electrode extending from the corresponding data line and a drain electrode spaced apart from the source electrode;
passivation layers, each of the passivation layers formed on the TFT and having a contact hole for exposing a part of the corresponding drain electrode; and
pixel electrodes, each of the pixel electrodes having a dual layer structure composed of a metal conductive layer and a metal insulation layer formed on the corresponding passivation layer and electrically connected to the corresponding drain electrode via the corresponding contact hole,
wherein the metal conductive layer in each pixel electrode has a dual layer structure composed of a metal layer and a transparent conductive layer, and
the metal insulation layer in each pixel electrode has a single layer structure.

5. The liquid crystal display device of claim 4, wherein the metal layer is made of one or more materials selected from a conductive metal group including molybdenum titanium (MoTi), aluminum (Al), aluminum (Al) alloy, chrome (Cr), tungsten (W) and copper (Cu),
wherein the transparent conductive layer is made of one or more materials selected from transparent metals including ITO, AZO, ZnO and IZO,
wherein the metal insulation layer is made of one material selected from inorganic insulating materials including metal nitrides, metal oxides, ITO, nitrides and oxides,
wherein a metal contained in the metal nitrides and the metal oxides is copper (Cu), aluminum (Al), aluminum (Al) alloy, chrome (Cr), tungsten (W) or molybdenum titanium (MoTi).

6. The liquid crystal display device of claim 1, wherein the pixel electrodes extend in a direction substantially parallel to a direction in which the common lines extend.

* * * * *